Jan. 2, 1968 — R. D. CHAPIN — 3,361,359
SOIL SOAKING SYSTEM
Filed Jan. 10, 1966 — 4 Sheets-Sheet 1
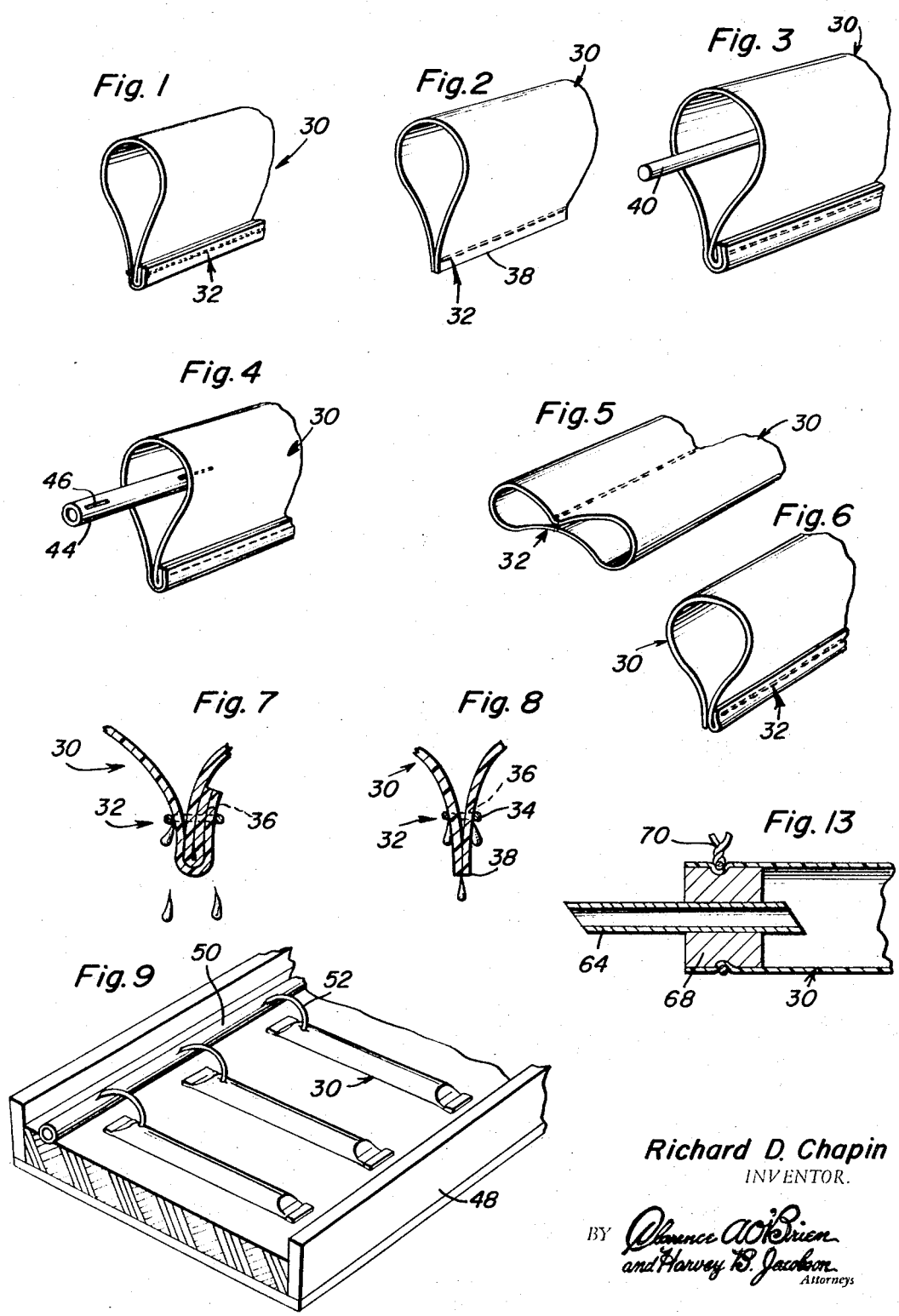
Richard D. Chapin
INVENTOR.

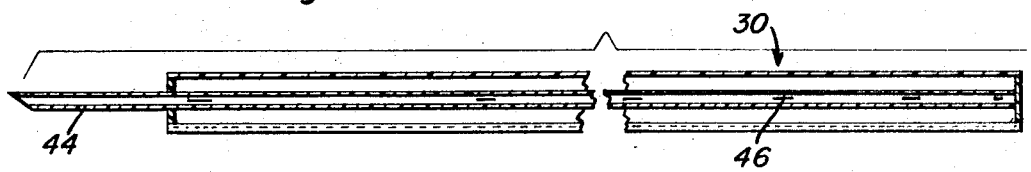
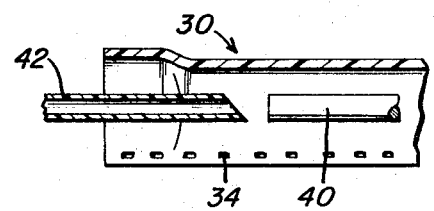
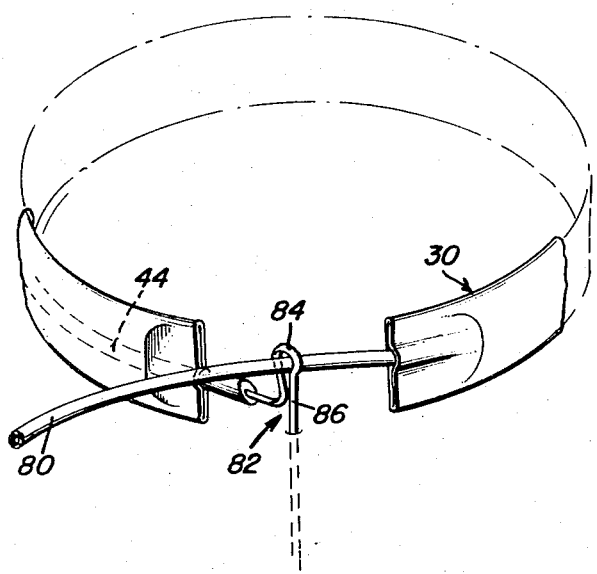
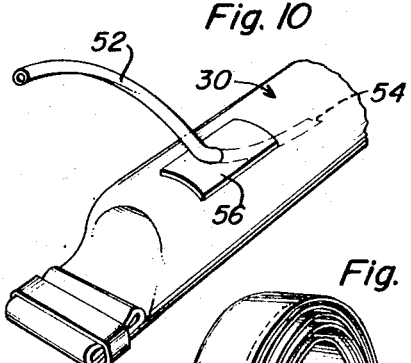
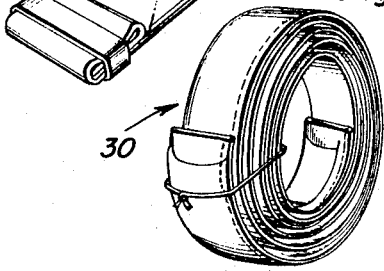
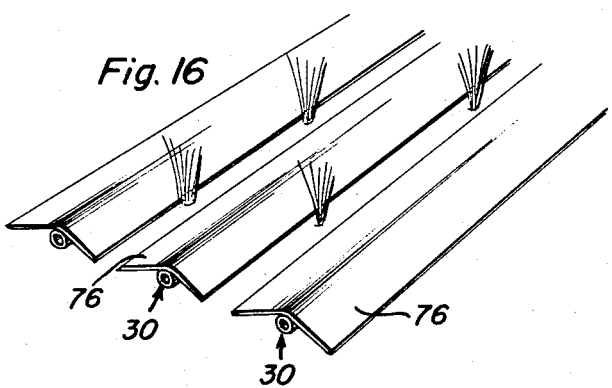

Jan. 2, 1968  R. D. CHAPIN  3,361,359
SOIL SOAKING SYSTEM

Filed Jan. 10, 1966  4 Sheets-Sheet 3

Richard D. Chapin
INVENTOR.

BY *Clarence A. O'Brien*
*and Harvey B. Jacobson*
Attorneys

Jan. 2, 1968   R. D. CHAPIN   3,361,359
SOIL SOAKING SYSTEM
Filed Jan. 10, 1966   4 Sheets-Sheet 4

Richard D. Chapin
INVENTOR.

BY Clarence A. O'Brien
and Harvey B. Jacobson
Attorneys

United States Patent Office 3,361,359
Patented Jan. 2, 1968

3,361,359
SOIL SOAKING SYSTEM
Richard D. Chapin, 368 N. Colorado Ave.,
Watertown, N.Y. 13601
Filed Jan. 10, 1966, Ser. No. 519,617
17 Claims. (Cl. 239—145)

The present invention is generally concerned with plant watering systems, and more particularly relates to a system, adaptable for anywhere from a single potted plant to thousands of field growing plants, wherein a direct soaking of the soil in a smooth and consistent manner is achieved without the disadvantages normally associated with more conventional soil soaking apparatus.

Heretofore soaking hoses have generally been made of canvas. However, such hoses have limited value both because such hoses can be used for only relatively small areas in that a substantial discharge of water occurs about the entire wall of the hose, and because of the tendency for the fabric of the canvas hose to rot.

Hand watering, especially on a commercial scale, also has many drawbacks, including the extensive time and effort involved, the tendency for the soil to be compacted, and the general lack of watering uniformly.

Another frequently used method involves overhead sprinkler-type devices. The disadvantages instant to such a system include the wetting of the blooms and foliage, thus tending to cause the spread of disease, the fact that overhead systems do not lend themselves well to the watering of specific areas such as long narrow beds, thereby resulting in a substantial waste of water due both to runoff and surface evaporation, and the difficulty in attempting to use such a system when plastic mulch is being used on field crops, or for that matter the low plastic tent-like enclosures frequently used when starting crops. Also, the overhead sprinkler systems frequently tend to result in soil compaction, flooding, and consequently poor aeration of the soil.

Accordingly, it is a primary object of the instant invention to provide for an efficient soil soaking system which, in addition to incorporating an adaptability to multicrop watering which could not heretofore be achieved by the more conventional systems, also includes none of the disadvantages associated with the more conventional systems.

In achieving the primary object, it is considered a significant object of the instant invention to provide a soaking hose which can be permanently or semi-permanently installed and which will neither rot nor mildew, being unaffected by rot causing microorganisms or extrinsic weather conditions in general.

Another highly significant object of the instant invention is to provide a soaking hose wherein the discharge is provided for only along a predetermined portion of the periphery of the hose wall so as to restrict the flow therefrom in a manner which enables a retention of a substantial portion of the water pressure throughout the length of the hose over extremely long distances, thereby enabling the accommodation of literally thousands of growing plants from a single source of water at household pressure.

In addition, it is a significant object of the instant invention to provide a soaking hose wherein the water discharge will be in the form of drips contemplated to provide a smooth and even soaking of the soil in the immediate vicinity of the growing plants with the water being directed directly to the soil and the blooms and foliage thereby receiving no damaging spray.

Further, it is an important object of the instant invention to provide a soaking hose which incorporates fluid passage means specifically designed so as to equally, and at substantially the same pressure, distribute water to the hose at spaced points along the full length thereof for a subsequent drip-like discharge of the water from the hose to the surrounding soil.

Also, it is a significant object of the instant invention to provide a soaking system wherein the soaking hose thereof can be accommodated to substantially any number of plants from a single potted specimen to thousands in field growing crops, as well as to specific areas whether regular or irregular in shape.

In conjunction with the above object, it is an object of the instant invention to provide a soaking hose which can be shaped in any desired manner so as to accommodate, for example, border planting, hedges, lawns, flower pots, etc., with a single system, with the hose retaining its shape, this shaping of the hose in no way affecting the soaking discharge of water therefrom.

It is also significant that the soaking hoses of the instant invention can be permanently installed if so desired, thus enabling a subsurface installation so as to avoid any waste of moisture through surface evaporation.

Furthermore, it is an object of the instant invention to provide a soaking system wherein the slow and uniform discharge of water will insure a proper watering of the plants even upon leaving the water on over long periods of time, this slow soaking of the soil and consequent removal of the danger of over-watering or flooding, particularly adapting the system for automatic operation.

Likewise, it is considered significant that the soaking hose be made of a relatively thin water-impervious plastic sheet-like material, generally polyethylene, in a manner whereby the formation of the water carrying hose-like shape simultaneously results in the formation of the water discharging holes therein, these holes being specifically defined so as to produce the slow directional drop-like discharge sought. By the same token, the utilization of flexible sheet-like material allows the finished hose to accommodate itself to irregular shapes and situations. For example, the soaking hose can be affixed to conventional sheet-like plastic mulch so as to enable a simultaneously unrolling of both the hose and the mulch, thereby simultaneously providing means for watering the crops, controlling weeds and conserving moisture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1–6 are perspective illustrations of several forms of soaking hoses constructed in accordance with the instant invention;

FIGURE 7 is a cross-sectional detail common to the hoses of FIGURES 1, 3 and 4;

FIGURE 8 is a cross-sectional detail of a portion of the hose of FIGURE 2;

FIGURE 9 illustrates an application of the system of the instant invention to a greenhouse bench;

FIGURE 10 is a partial perspective view illustrating one manner of communicating the soaking hose with a source of pressurized water;

FIGURE 13 illustrates a further form of introducing water into the soaking hose for discharge therefrom;

FIGURE 15 illustrates another manner of providing for a circular arrangement of the water supplied soaking hose of the instant invention;

FIGURE 16 illustrates a combined unit incorporating both a soaking hose and a plastic mulching sheet;

Figure 17:
Figure 20:
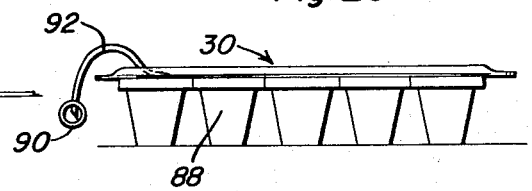
Figure 21:
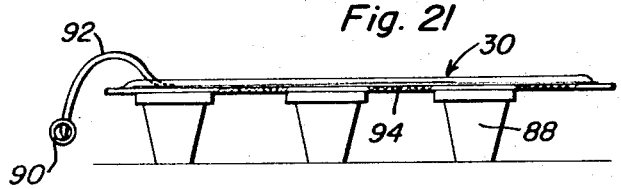
Figure 22:
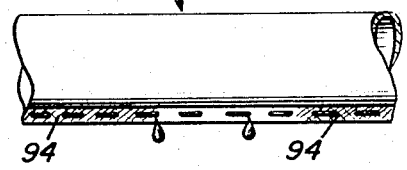
Figure 25:
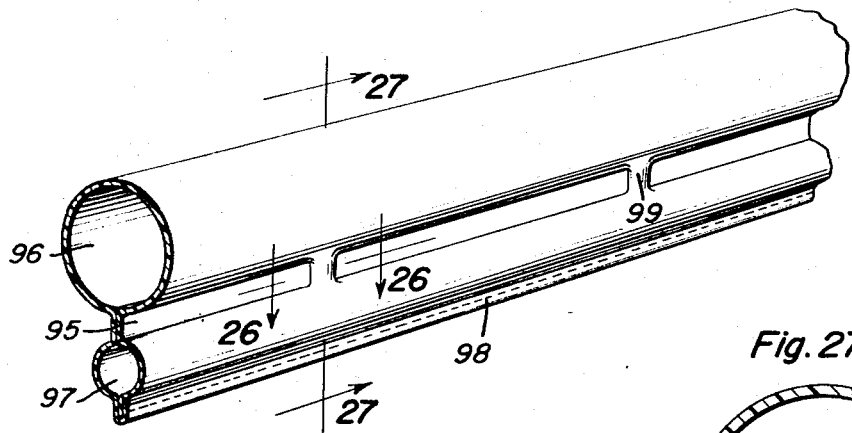
Figure 27:
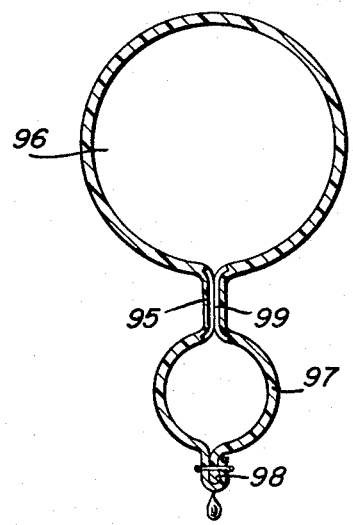
Figure 28:
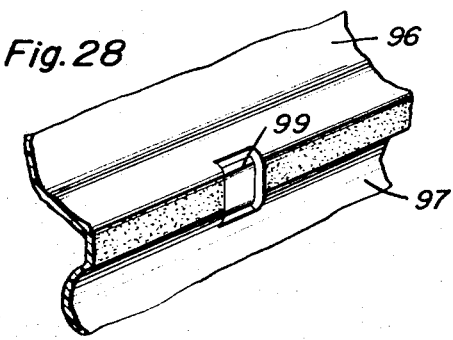
Figure 26:
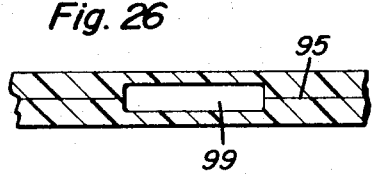
Figure 29:
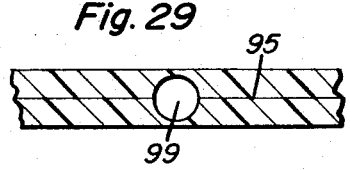

FIGURE 17 schematically illustrates the manner in which the soaking hose of the instant invention can be effectively accommodated to field crops, even in conjunction with superimposed conventional plastic mulch covers;

FIGURE 18 is a longitudinal cross-sectional view through the soaking hose of FIGURE 4 illustrating the manner in which the water supplying tube can be provided along the full length therein;

FIGURE 19 is a partial longitudinal cross-sectional view through the soaking hose of FIGURE 3 illustrating one manner of introducing water thereinto and also illustrating the internally positioned shaping weight element;

FIGURE 20 illustrates the adaptation of the system to a plurality of adjacent plant pots;

FIGURE 21 illustrates the system of FIGURE 20 wherein the pots are spaced from each other, the water discharging needle holes being selectively closed so as to restrict the discharge of water solely to the pots;

FIGURE 22 is an enlarged view illustrating the selective heat sealing of the water discharging openings;

FIGURE 23 generally illustrates an underground installation utilizing the soaking hoses of the instant invention;

FIGURE 24 is a perspective view illustrating the manner in which the soaking hose of the instant invention can be conveniently compressed and rolled for storage;

FIGURE 25 shows a final form of soaking hose to be specifically illustrated;

FIGURE 26 is an enlarged cross-sectional view taken substantially on a plane passing along line 26—26 in FIGURE 25;

FIGURE 27 is an enlarged cross-sectional view taken substantially on a plane passing along line 27—27 in FIGURE 25;

FIGURE 28 is a perspective detail illustrating a portion of the interior of the hose of FIGURE 25; and FIGURE 29 is a view similar to FIGURE 26 illustrating a slightly modified form of molded water gap or passageway.

Referring now more specifically to the drawings, reference numeral 30 is used to generally designate the soaking hose constituting the most significant feature of the instant invention. This hose 30, capable of being modified in various manners as will be appreciated from FIGURES 1–6, consists basically of an elongated flat sheet of water-impervious flexible material, such as polyethylene, doubled over about the longitudinal centerline so as to form a pair of overlying generally flat panels, the free edges of which are sewn together so as to define a tubular member. This tubular member or hose 30, as will be appreciated, in the absence of an internal flow of water, can be collapsed substantially flat for rolling, folding, or the like, a flat-rolled hose being illustrated in FIGURE 24. When inflated, the hose 30 will normally assume a cylindrical shape, generally rounder than that illustrated in FIGURES 1–6, depending of course upon the internal water pressure.

The water, introduced into the soaking hose 30 from a pressurized source in any of a variety of manners as shall be described presently, is to discharge from the hose 30 along the entire effective length thereof in a manner contemplated so as to enable a soaking of the water into the soil without any danger of overwatering or flooding, this discharge of water thereby preferably being in the form of small drops. The soaking hose 30 of the instant invention provides for this drop-like discharge of water along the full length thereof through the needle holes made for the accommodation of the securing thread used in making the sewn seam, this seam being generally indicated by reference numeral 32 with the thread being indicated by reference numeral 34 and the thread-accommodating holes by reference numeral 36. Inasmuch as the hose material 30 is water-impervious, the drip-like discharge of the water will normally occur only through the thread holes 36. The thread 34 itself will of course tend to reduce the water passing portion of the holes or openings 36 so as to further restrict the flow therethrough with the holes 36 of course always being slightly larger than the thread 34 passing therethrough, or at least elastically enlargeable under the internal water pressure, so as to provide for the desired discharge. Further, it will be appreciated that the rate of flow can be adjusted through a regulation of various factors, including the relationship of the size of the needle holes to the size of the thread, and the actual wall thickness of the hose-forming material.

Thus, it will be appreciated that a highly economical manner has been devised for both forming a tube or hose 30 and providing this tube with a series of water-discharging outlets or holes 36 along the entire effective length thereof, this being effected through the sewing of a strip of sheet-like flat material into a generally tubular form while providing for a specific relationship between the size of the needle formed hole and the size of the securing thread, also taking into account the thickness of the material itself. Incidentally, the thread itself will also consist of a suitable rot-resistant material so as to complement the material of the hose 30. The relatively slow discharge achieved from the hose 30 not only results in a slow even and highly efficient watering of plants, but also enables the use of extremely long lengths of hose from conventional pressurized water sources without any appreciable drop in pressure, thereby enabling the watering of literally hundreds to thousands of linear feet of growing plants from a single faucet, examples of which shall be pointed out subsequently. Further, the uniform and gentle oozing of the water from the hose 30 eliminates soil compaction, normally associated with overhead spraying and hand watering, thereby permitting nearly perfect aeration of the soil.

Referring again to FIGURE 1, it will be noted that the hose material, prior to the sewing of the seam 32, has both free edges reversely bent so as to form a relatively effective water seal, thereby insuring a discharge of the water substantially only through the needle openings 36 as illustrated in the sectional view of FIGURE 7. FIGURE 2 illustrates a sewn joint wherein the free edges 38 are left straight or unfolded thus allowing for a slight discharge of water from between the hose walls themselves as illustrated in FIGURE 8. This additional discharge, however, will normally be less than that through the regular discharge holes 36 which in itself will be slightly greater than that of the form of FIGURE 1 in that the holes through both hose walls need only penetrate single thickness walls on both sides, rather than the triple thickness on the one side of the FIGURE 1 hose 30.

FIGURE 6 illustrates the formation of the seamed joint in a manner which in effect constitutes a compromise between the joints of FIGURES 1 and 2. In this form, only one of the free edge portions is reversely bent, thus providing a pierced double wall portion and a pierced single wall portion on opposite sides of the joint resulting in a greater flow capacity as compared to the hose joint of FIGURE 1, and a lesser flow capacity when compared to the joint of FIGURE 2, the reversely folded double wall portion tending to more positively seal the space between the walls upon a water-responsive inflation of the major portion of the tube above the stitching. Incidently, one particular advantage of what might be called the unwrapped joint of FIGURES 2 and 6 is that the tube can be simply flushed of foreign matter by running the thumb and index finger along the tube when filled with water. This squeezing of the tube tends to cause a slight parting of the walls within the joint and allows the water to spurt out therefrom so as to effect the desired discharge of any foreign matter which might have accumulated within the tube and about the discharge openings 36.

The form of hose 30 shown in FIGURE 5 is formed utilizing a preformed tubular member of flexible sheet-like material wherein the stitching which provides the needle hole discharge openings extends centrally through the tube so as to define two fluid passages which may or may not be of substantially equal size, this hose 30 of FIGURE 5 otherwise functioning in the same manner as the other forms of hose 30.

Figure 14:
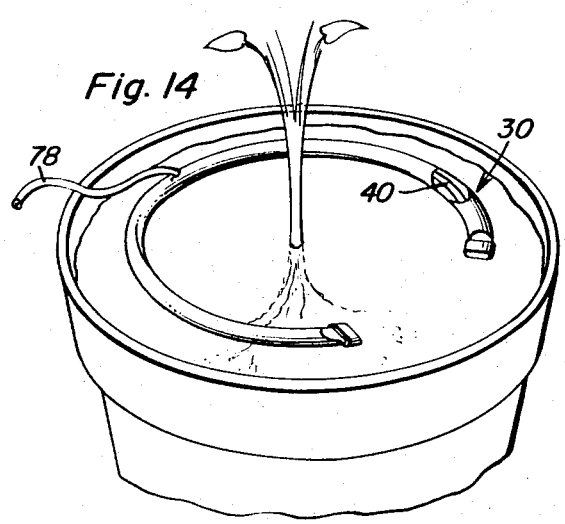
FIGURE 14 is a perspective view illustrating the accommodation of a soaking hose in accordance with the instant invention to a single potted plant.

FIGURE 3 illustrates the soaking hose 30 incorporating a weight-adding member 40 which has a substantially lesser cross-sectional area than the hose 30 itself so as to not interfere with the flow of water therethrough. This weight 40 which can, if so desired, run either the full length of the hose or along any portion thereof, is provided so as to act as an anchoring means for retaining the normally lightweight hose in position in, for example, a potted plant as illustrated in FIGURE 14. In addition to introducing relatively greater weight to the hose 30, the member 40 is to be of a flexible nature capable of being shaped and retaining its shape. One particularly useful material for this purpose would be lead rods or bars. FIGURE 14 also illustrates one manner of shaping the hose 30 through the use of the internal member 40. Further, the member 40 also enables a relatively sharp bending of the hose 30 itself without closing off the water passage entirely such as would inhibit the operation of the system. Incidently, attention is also directed to FIGURE 19 wherein a cross-section is taken through the hose 30 illustrating both the internally positioned lead rod or wire 40 and a fluid-introducing tube 42 inserted in the heat sealed end of the hose 30.

The hose 30 of FIGURE 4 incorporates, longitudinally therethrough, a relatively smaller water-carrying tube 44 which in turn has a plurality of water discharging slits or holes 46 therein along the entire received length thereof as will possibly be better appreciated from the cross-sectional view of this form in FIGURE 18. These holes 46 may be as much as several feet apart and discharge the water in a smooth flow into the hose 30 for a subsequent oozing discharge from the hose. It will be noted that these slits 46, which can be either permanently open or openable in response to the internal pressure of the water, are located progressively closer to each other from the inlet end of the tube 44 to the remote end thereof, thereby assuring a substantially equal introduction of water from the tube 44 into the hose 30 and an equalization of the water pressure along the full length thereof. The utilization of the internal water-carrying tube 44 in conjunction with the hose 30 will be particularly useful as a means for allowing an increase in the effective length of the hose 30 while still maintaining an adequate flow of water throughout the full length thereof in what might be, under some circumstances, a more efficiently operating system. It will of course be appreciated that the tube 44 will also function so as to prevent any bending of the hose 30 to such a degree as to interrupt the water flow, the tube 44 itself being of a relatively rigid shape-sustaining plastic capable of being longitudinally shaped along the length thereof as suggested in FIGURE 15.

FIGURE 9 illustrates one manner of utilizing the soaking hose 30, preferably in the form illustrated in FIGURES 1, 2, 5 or 6. In this arrangement, individual hoses 30, sealed at the opposite ends thereof in any suitable manner such as heat sealing, taping as illustrated in FIGURE 10, or plugging as suggested in FIGURE 13, are orientated laterally across a typical greenhouse bench 48 and individually communicated with a water main 50 through water inlet supply tubes 52. These supply tubes 52, in this particular arrangement, have been illustrated as communicated with the corresponding hoses 30 by inserting the beveled end 54 thereof through a tape reinforced portion 56 of the hose 30 itself as illustrated in FIGURE 10. This frictional engagement of the supply tube 52 into the hose 30 is to of course be substantially watertight. With this arrangement, a typical greenhouse bench one hundred feet long by four feet wide can be supplied from a single one-half inch main 50 through one hundred and fifty soaking hoses 30 four feet long and spaced eight inches apart with the hoses 30 having a general inside or internal diameter of $5/16''$ and with the supply inlet tubes 52 having an internal diameter of approximately .035''. The relatively small water passage defined by both the inlet tubes 52 and the tubes which shall be subsequently described meters the flow of water so as to enable the supplying of a multiplicity of hoses with a relatively even flow to each hose.

Figure 11:
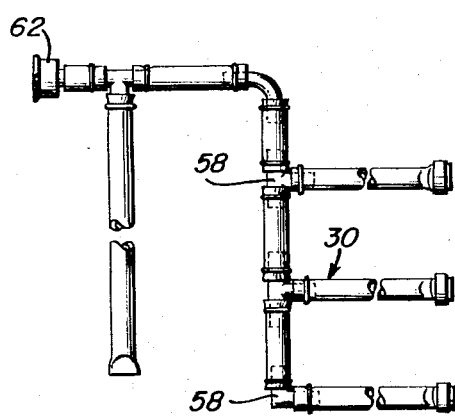
FIGURE 11 illustrates an arrangement of soaking hoses connected both in series and in parallel through conventional T and L pipe connectors.

Another arrangement is illustrated in FIGURE 11 wherein a plurality of hoses 30 are directly interconnected through coupling Ts and Ls 58 with the outer ends of the hoses 30 being appropriately sealed as at 60 and with a suitable coupling 62 being provided for communication with a source of pressurized water.

Figure 12:
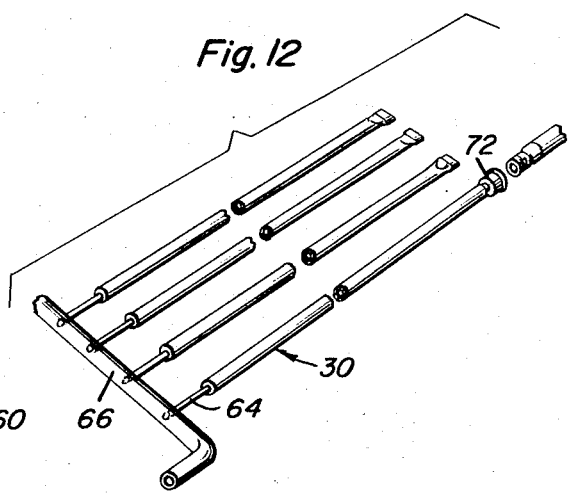
FIGURE 12 illustrates a further arrangement of the soaking hoses for use in conjunction with either a greenhouse bench or a crop bed.

FIGURE 12 illustrates an arrangement wherein the hoses 30, which may be of any of the forms illustrated in FIGURES 1-6, extend longitudinally along a greenhouse bench or field bed for approximately one hundred feet, being supplied, in this instance, from water inlet supply tubes 64 which in turn are communicated with a water main 66. Typically, with this arrangement, the hoses 30 can have, when filled, an internal diameter of three-quarters of an inch with the supply tubes having an internal diameter of .080''. Incidently, in the event the bench or bed is located remote from the main 66, the supply tubes 64 can extend for considerable lengths, approximately twenty-five to fifty feet or even more. The opposite ends of the supply tubes 64 are of course in water transferring communication with both the main 66 and the corresponding hoses 30, the engagement of each tube 64 with its corresponding hose 30, in this arrangement, being either as illustrated in FIGURE 13 or, as an alternative, as illustrated in FIGURE 10. From FIGURE 13, it will be noted that the end of the tube 64 is frictionally received through a plug or stopper 68 which in turn is inserted into the adjoining end of the hose 30 with the hose 30 being tightly clamped thereto as by the wire clamp 70. The opposite end of the hose 30, as well as the other hoses 30, can be sealed in any suitable manner, such as by heat sealing, taping or the insertion of another stopper 68 without of course the hole therethrough. In addition, if so desired, the remote end of the hose 30 can be provided with a male or female hose coupling 72 either for the reception of a sealing cap or an additional length of hose 30 for extending the effective length thereof. The provision of a removable cap is particularly desirable in that it enables a ready flushing of foreign material from the interior of the hose by merely removing the cap and allowing the water to run therethrough.

FIGURE 17 illustrates a field crop such as melons with a soaking hose 30 being positioned adjacent each row and beneath a plastic mulch cover 74 such as is frequently used to control weeds, conserve moisture, and cause the crops to mature earlier through a holding of the sun's heat. The positioning of the soaking hoses 30 beneath the mulch cover 74 insures an adequate supply of moisture such as would otherwise be difficult to provide. With regard to field crops in particular, when a row runs over two hundred feet long the hose 30 associated therewith will normally be supplied with water at approximately the middle thereof rather than at one extreme end as generally illustrated in the drawings.

FIGURE 16 illustrates a slightly modified form of system as compared to that of FIGURE 17 in that FIGURE 16 illustrates individual plastic mulch sheets 76 sealed or fixed to the hoses 30 so as to in effect become an integral part thereof. In this manner, both the hose 30 and mulch sheet 76 can be simultaneously positioned between the crop rows, as well as simultaneously removed and rolled together for storage, thereby providing for a highly simplified system of both mulching and providing for the irrigation of field crops. It will of course be appreciated that in placing the combined hose and mulch unit, the hose 30 will underlie the strip-like mulching sheet 76.

As noted supra, FIGURE 14 illustrates one particularly useful adaptation of the weighted rod-containing hose 30 of FIGURE 3, the weighted hose 30 in this instance enabling a shaping of the hose so as to encircle a potted plant with the additional weight of the internal rod 40 retaining the hose 30 in position and also enabling a shaping of the hose 30 without cutting off the flow of water therein. In this instance, it will be noted that the supply tube 78 is communicated with a central portion of the hose 30 with the opposite ends of the hose 30 being sealed.

As a modification of the arrangement illustrated in FIGURE 14, it will be noted that FIGURE 15 also provides for an area encircling arrangement of the hose 30, in this instance the hose 30 incorporating the internal water-introducing tube 44, one end 80 of which is extended into communication with a suitable water supply main, and the other end of which projects from the opposite end of the hose 30 and is sealed by a looped ground-engaging anchoring member 82 which locks to the inlet portion 80 of the tube 44 as illustrated. In this manner, the anchoring member 82, in addition to positively positioning the hose 30 in the plant growing medium, also effectively retains the desired circular shape of the hose 30. The looped portion 84 of the anchor member 82, in order to receive the inlet end of the hose 44, includes a narrow opening 86 through which the tube portion 80 is forced and thereby retained, this being obvious from a viewing of FIGURE 15. With the arrangements illustrated in FIGURES 14 and 15, which incidently can also be used in conjunction with field growing plants, several hundred hoses 30 can be supplied from a single three-quarter inch water main at average city water pressure when utilizing inlet supply tubes having a relatively small internal diameter, such as .035".

FIGURES 20 and 21 illustrate rows of containers 88 which may be boxes, pots, tubs, or flats, with the hoses 30 simply lying across the open tops thereof and communicated, normally at one end, with a suitable water main 90 by means of inlet tubes 92. In those instances where the containers 88 are in spaced relation to each other as illustrated in FIGURE 21, those portions of the seams which occur between the containers 88 can be suitably sealed, such as for example by heat sealing generally indicated at 94 in FIGURES 21 and 22, so as to preclude any discharge therefrom, thereby preventing water flowing between the containers and being wasted.

FIGURE 23 illustrates the fact that the soaking hoses 30 of the instant invention, due to the non-rotting nature thereof, can be buried below the surface of the earth, in this manner effecting a water saving, in the irrigation of lawns, gardens, etc., of approximately 50% as compared with overhead spraying systems, due to the elimination of both surface evaporation and runoff. The hoses 30 will normally be buried several inches below the surface and spaced 18 to 24 or more inches apart depending on the lateral water movement capacity of the soil.

FIGURE 24 is a perspective view illustrating the soaking hose 30 collapsed and rolled for storage, showing the compact and easily handled nature thereof due to its sheet-like construction.

The final form of soaking hose to be specifically illustrated is shown in FIGURES 25–29. This form of the hose 30 includes a generally centrally located seal 95 extending longitudinally along the entire effective length of the hose 30 so as to define two fluid passages 96 and 97. The fluid passage 96, provided between the fold in the material and the seal 95, is substantially larger than the fluid passage 97 and functions so as to carry a pressurized supply of water along the full length of the relatively smaller fluid passage 97 for equal discharge of the water to the passage 97 along the full length thereof. The passage 97, as will be appreciated from the drawings, is defined by the seal 95 and the sewn water-discharging seam 98.

The water is discharged from the passage 96 into the passage 97 through a plurality of molded gaps or passageways 99 spaced at substantially equal intervals throughout the length of the sealed portion 95 of the hose. Each of the gaps or passageways 99 in the seal 95 is specifically formed by a pair of opposed indentations or recesses in the panels defining the hose, these passageways being of any suitable configuration, such as rectangular or circular as illustrated in FIGURES 26 and 29. The forming of the passageways 99 by specifically recessing or indenting the opposed panels rather than merely discontinuing the seal 95, which incidently may be in the nature of a heat sealing, is considered particularly significant in that the passageways thus formed will remain open when the passages 96 and 97, especially 96, are subjected to water pressure, and thereby continuously provide for a relatively uniform discharge of water from the fluid passage 96 to the fluid passage 97. On the contrary, were the passageways 99 merely formed by discontinuing the seal 95, there would be a substantial tendency for these passageways to close as pressure is exerted on the walls of the passage 96, this in turn greatly affecting the desired discharge of water.

In use, the water is supplied to the fluid passage 96 in any of the manners described supra, in connection with the other forms of the hose 30. The water fills the fluid passage 96 along the full length thereof until sufficient pressure is achieved so as to in effect force the water to flow through the gaps or passageways 99 into the fluid passage 97. The fluid passage 97 will then fill to a pressure sufficient so as to cause the water to ooze through the seam 98 in the same drip-like discharge noted supra. The passageways 99 are to be small enough relative to the inside diameter and length of the fluid passage 96 so as to insure the provision of a relatively uniform pressure throughout the length of the fluid passage 96 so as to in turn provide for a relatively uniform water flow from the fluid passage 96 through each of the gaps or passageways 99.

The fluid passage 97 is to be relatively small in diameter, and such so as to produce sufficient friction whereby a major portion of the water flowing through each of the gaps 99 will tend to flow out of the seam 98 in the vicinity of the gap 99, this vicinity of the gap being normally from half-way to the next gap 99 on one side of the gap through which the water is flowing to half-way to the gap 99 on the other side. In this manner, there will be a minimum flow of water from one gap area to the next, thereby further tending to cause a relatively uniform flow of water out of the seam 98 along the full length thereof.

With this system, even when used in a field or on a greenhouse bench with considerable slope, the flow from the fluid passage 96 through the gaps or passageways 99 is relatively uniform inasmuch as a pressure of 5 to 7 pounds can usually be maintained within the fluid passage 96, and a ground slope of 4 to 5 feet would have relatively little effect on this much pressure. As an example, a hose with an inside diameter of ¾" in fluid passage 96, with gap passageways 99 of .006" by .125" spaced 30 inches apart will water a 200 foot length on a slope of 4 to 5 feet with a relatively even flow.

As will be appreciated, the purpose of this last variation is to provide another practical and efficient method of insuring even water distribution over the entire length of the hose 30, this being effected over extremely long runs or on sloping runs.

While several specific sizes have been mentioned, it will of course be appreciated that both smaller and larger size soaking hoses can be provided with the greater length hoses necessitating a larger internal diameter so as to offset the greater frictional loss and provide uniform watering throughout the length thereof. Utilizing larger hoses, it would not be unusual to obtain runs extending several hundred feet from the water inlet. The hoses themselves, as noted originally, are to be made of water-impervious material, for example polyethylene, generally .008″ in thickness, with the hoses also being conveniently made from material ranging in thickness from .002″ to .020″. As the flow resistance increases at the water discharge holes, the flow rate from these holes will decrease and consequently a greater total footage of hose can be supplied from a given water volume. This increased resistance to flow can be effected through a decreasing of the needle size, an increasing of the thread size, an increasing of the material thickness, or an increasing of the number of layers of material at the seam. Generally, the capacity of one of the more conventionally contemplated systems of the instant invention, will be such that 5000 to 7000 lineal feet of hose can be operated simultaneously from an ordinary garden hose utilizing house pressure.

From the foregoing, it should be appreciated that a highly unique soil soaking system has been devised utilizing in particular a highly unique soaking hose wherein selectively perforated water-impervious lengths are provided from sheet-like material with the single step of forming the hose simultaneously defining the restricted water discharge openings therein. In addition, the water discharge openings themselves are so formed and restrictively defined as to insure a smooth drip-like discharge contemplated to evenly and consistently soak the soil in the immediate vicinity of the growing plants in a manner whereby no wastage occurs and no misdirection of the water, such as upon the blooms or foliage, is possible. Likewise, while, through the rotproof nature thereof, the system is capable of permanent installation, the utilization of hoses which, when collapsed, are in the form of thin elongated sheets, enables a rolling of the hoses into compact, easily stored rolls or packages having none of the bulk normally associated with extensive hose-watering systems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in a fluid distributing system for plants, an elongated hollow fluid discharging member, said member constituting a sheet-like strip of generally water-impervious material folded on itself about a longitudinal line and having the edge portions thereof overlying each other spaced from the longitudinal line, means securing the overlying edge portions to each other along the full length thereof so as to define a longitudinal flow passage between the secured edge portions and the longitudinal line, said means securing the overlying edge portions defining a series of minute fluid discharging openings along the length thereof, and means for introducing fluid from a pressurized source into the longitudinal flow passage.

2. The structure of claim 1 wherein said means securing the overlying edge portions comprises a sewn seam incorporating a series of needle holes receiving securing thread therethrough and defining said fluid discharging openings.

3. The structure of claim 2 wherein said means for introducing fluid includes an elongated flexible fluid transferring tube extending longitudinally within the longitudinal flow passage and having a cross-section substantially less than that of the flow passage, said tube being of cross-section retaining material and flexible along the length thereof so as to enable a nonlinear positioning of the member and tube, said tube having a series of fluid discharging apertures along the contained length thereof.

4. The structure of claim 2 including an elongated flexible weight positioned within the longitudinal flow passage and extending along a portion thereof, said weight having a cross-sectional area substantially less than that of the flow passage.

5. The structure of claim 2 wherein said means for introducing fluid includes an elongated open-ended tube, one end of said tube being engaged through a portion of the member and into fluid transferring communication with the flow passage.

6. The structure of claim 2 wherein said overlying edge portions are reversely folded in overlying relationship toward one side of the member so as to restrict the flow of water therethrough.

7. The structure of claim 2 including means sealing selected portions of said sewn seam at spaced points along the length thereof so as to restrict the discharge of water therethrough.

8. The structure of claim 1 including a longitudinally extending seal throughout the length of the member, said seal defining two adjacent independent fluid passages within the flow passage, and periodic discharge passageways through said seal communicating said fluid passages, said means for introducing fluid being communicated with a first one of said fluid passages, said passageways discharging fluid from the first one of said fluid passages to the second fluid passage to be distributed by the member.

9. The structure of claim 8 wherein the first fluid passage is defined by the fold and the seal and is of a size sufficiently large so as to supply the second fluid passage, defined by the seam and the seal, with a uniform amount of water through each discharge passageway.

10. The structure of claim 9 wherein the second fluid passage is of a size sufficiently small so as to frictionally restrict the fluid being discharged from each passageway for subsequent discharge through that portion of the seam immediately adjacent to the corresponding passageway.

11. The structure of claim 8 wherein each passageway is defined by recesses formed within the opposed portions of the folded material.

12. A water distributing system including an elongated hollow fluid discharging member, said member comprising a pair of elongated flexible substantially water-impervious sheet-like panels overlying each other, said panels being integral with each other along first edges thereof, a longitudinally extending sewn seam securing said panels to each other in parallel spaced relation to the integral edges, said seam being defined by securing thread woven through a series of minute openings, said openings constituting water passages, the water passing nature of said openings being restricted by the securing thread passing therethrough, and means for introducing water between said panels for subsequent discharge through said openings.

13. The system of claim 12 wherein the second edges of said panels are integral with each other, said seam extending longitudinally between said first and second integral edges and defining a pair of fluid passages between the panel portions on opposite sides thereof.

14. The system of claim 12 wherein said seam is located adjacent the second edges of said panels, said second edges defining therebetween secondary water passing means.

15. The system of claim 12 wherein the second edge of at least one of the panels is reversely folded, said seam extending through the reversely folded portion.

16. The system of claim 12 including a relatively wide sheet-like strip overlying said member along a substantial portion of the length thereof and projecting laterally therefrom.

17. The method of forming a water distributing member comprising the steps of forming an elongated flexible strip of water-impervious material, folding said strip along a longitudinal line so as to form generally equal width overlying panels with adjacent free edges, and sewing said panels together adjacent said free edges, forming needle holes slightly larger than the securing thread.

References Cited

UNITED STATES PATENTS

| | | | |
|---|---|---|---|
| 1,989,427 | 1/1935 | Robey | 239—145 X |
| 2,566,833 | 9/1951 | Healy | 239—266 X |
| 2,769,668 | 11/1956 | Richards | 239—145 |

M. HENSON WOOD, Jr., *Primary Examiner.*

H. NATTER, *Assistant Examiner.*